(No Model.)
J. S. FREESE.
OPERATING GEAR FOR SEWING MACHINES.
No. 304,924. Patented Sept. 9, 1884.
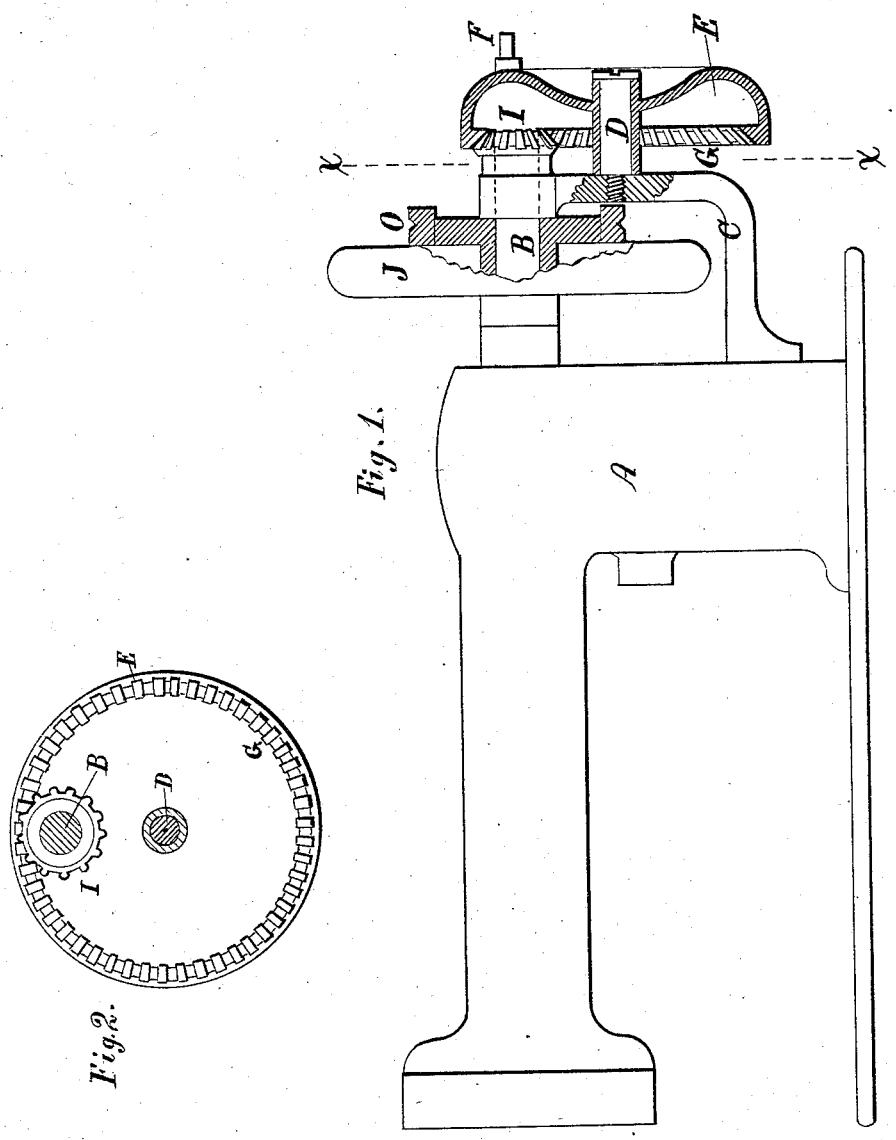
WITNESSES:
INVENTOR
John S. Freese
BY
Francis C. Bowen
ATTORNEY

UNITED STATES PATENT OFFICE.

JOHN S. FREESE, OF BROOKLYN, NEW YORK.

OPERATING-GEAR FOR SEWING-MACHINES.

SPECIFICATION forming part of Letters Patent No. 304,924, dated September 9, 1884.

Application filed March 21, 1884. (No model.)

*To all whom it may concern:*

Be it known that I, JOHN S. FREESE, a citizen of the United States, residing at Brooklyn, in the county of Kings and State of New York, have invented certain new and useful Improvements in Operating-Gear for Sewing-Machines, of which the following is a specification, reference being had therein to the accompanying drawings.

My invention relates to means for imparting motion to the needle-bar-operating shaft, of sewing-machines, and especially with the aid of a mechanical movement such as described in my Letters Patent No. 239,480, dated March 29, 1881.

The novel features of my present invention are hereinafter fully described, and illustrated in the accompanying drawings, in which—

Figure 1 is a side view, partly in section, of portion of a sewing-machine embodying my invention. Fig. 2 is a cross-section taken on the line *x x*, Fig. 1.

Similar letters indicate similar parts.

The letter A designates the machine-arm, and B the needle-bar-operating shaft projecting from the arm at the rear end.

C indicates a bracket, which is attached to the machine-arm to form a bearing for the outer portion of the shaft, and D indicates a stud projecting from the bracket in an outward direction. On this stud is mounted axially a disk, E, in shape like a cap, which is adapted to receive a revolving motion from a proper source by means of a pitman, (not represented,) having one end connected to an eccentric, F, thereof. Internally of this disk E are teeth, forming a rack, G, into which gears a pinion, I, mounted on the operating-shaft B, so that in the revolving motion of the disk a corresponding motion is imparted to the pinion, and thence to the operating-shaft, through the medium of the rack. The position of the disk E on the stud D is such that the open side of the disk faces inward toward the machine-frame, and consequently the disk not only is in proper relation to the pinion, but also is least likely to admit any threads, fibers, or cloth, or other matters tending to clog the teeth. In the example shown the teeth of the rack F and pinion G are beveled; but it is evident they may be straight. At a point within the shaft C the operating-shaft B carries the usual fly-wheel, J, which may be provided with a pulley, O, so that the shaft may be driven by a belt, if desirable.

An essential element of my invention is the bracket C, forming one of the bearings of the bar-operating shaft B, and supporting the stud D, on which the disk E revolves, the whole forming a simple and compact structure.

What I claim, and desire to secure by Letters Patent, is—

As an improvement in operating-gear for sewing-machines, the combination, with the needle-bar-operating shaft B, of the pinion I, mounted on said shaft, and the revolving cap-like disk E, having an internal rack, G, gearing with said pinion, said disk being mounted on a stud, D, projecting from a bracket, C, which also forms a bearing for the operating-shaft, as set forth.

In testimony whereof I affix my signature in presence of two witnesses.

JOHN S. FREESE.

Witnesses:
FRANCIS C. BOWEN,
JAS. S. EWBANK.